(12) United States Patent
Kiyota et al.

(10) Patent No.: US 10,465,362 B2
(45) Date of Patent: Nov. 5, 2019

(54) HUMAN DETECTION SYSTEM FOR CONSTRUCTION MACHINE

(71) Applicant: SUMITOMO HEAVY INDUSTRIES, LTD., Tokyo (JP)

(72) Inventors: Yoshihisa Kiyota, Kanagawa (JP); Susumu Aizawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/362,968

(22) Filed: Nov. 29, 2016

(65) Prior Publication Data

US 2017/0073934 A1 Mar. 16, 2017

Related U.S. Application Data

(63) Continuation of application No. PCT/JP2015/065094, filed on May 26, 2015.

(30) Foreign Application Priority Data

Jun. 3, 2014 (JP) .................................. 2014-115227

(51) Int. Cl.
*G06K 9/00* (2006.01)
*G06K 9/62* (2006.01)
(Continued)

(52) U.S. Cl.
CPC ................... *E02F 9/26* (2013.01); *B60R 1/00* (2013.01); *E02F 9/24* (2013.01); *E02F 9/261* (2013.01);
(Continued)

(58) Field of Classification Search
None
See application file for complete search history.

(56) References Cited

U.S. PATENT DOCUMENTS 9,336,436 B1 * 5/2016 Dowdall ................. G08G 1/166
9,715,015 B2 * 7/2017 Izumikawa ............. G01S 17/42
(Continued)

FOREIGN PATENT DOCUMENTS

CN 102136076 7/2011
CN 102136076 A * 7/2011
(Continued)

OTHER PUBLICATIONS

Wu, Bo, and Ram Nevatia. "Detection and tracking of multiple, partially occluded humans by bayesian combination of edgelet based part detectors." International Journal of Computer Vision 75.2 (2007): 247-266. (Year: 2007).*

(Continued)

*Primary Examiner* — Samah A Beg
(74) *Attorney, Agent, or Firm* — IPUSA, PLLC

(57) ABSTRACT

A human detection system may detect the presence of a human around a shovel by using an image captured by an imaging device attached to the shovel. Also, the human detection system may have an extracting part that extracts a part of the captured image as an identification process target image, and an identifying part that identifies whether an image included in the identification process target image is an image of a human. A region of the identification process target image is preliminarily associated with one of head image positions in the captured image. The extracting part finds out a helmet image in the captured image, and extracts the identification process target image by associating a representative position of the helmet image with one of the head image positions.

18 Claims, 16 Drawing Sheets

(51) Int. Cl.
  *E02F 9/26* (2006.01)
  *H04N 7/18* (2006.01)
  *B60R 1/00* (2006.01)
  *E02F 9/24* (2006.01)
  *E02F 3/32* (2006.01)

(52) U.S. Cl.
  CPC .......... *E02F 9/262* (2013.01); *G06K 9/00362* (2013.01); *G06K 9/00805* (2013.01); *G06K 9/6215* (2013.01); *H04N 7/18* (2013.01); *H04N 7/183* (2013.01); *B60R 2300/30* (2013.01); *B60R 2300/8033* (2013.01); *E02F 3/32* (2013.01)

(56) References Cited

U.S. PATENT DOCUMENTS

| | | | | |
|---|---|---|---|---|
| 9,776,564 | B2 * | 10/2017 | Miyagawa | B60Q 9/008 |
| 2002/0150308 | A1 * | 10/2002 | Nakamura | G06K 9/00201 382/286 |
| 2003/0107653 | A1 * | 6/2003 | Utsumi | G06K 9/00362 348/207.99 |
| 2004/0091153 | A1 * | 5/2004 | Nakano | G06K 9/00228 382/228 |
| 2005/0063565 | A1 * | 3/2005 | Nagaoka | B60R 21/013 382/104 |
| 2008/0089557 | A1 * | 4/2008 | Iwaki | G01C 3/06 382/106 |
| 2009/0041297 | A1 * | 2/2009 | Zhang | G06K 9/00362 382/103 |
| 2009/0087100 | A1 * | 4/2009 | Hu | G06K 9/00228 382/190 |
| 2010/0013615 | A1 * | 1/2010 | Hebert | B60Q 9/006 340/425.5 |
| 2010/0066516 | A1 * | 3/2010 | Matsukawa | B60R 1/00 340/435 |
| 2010/0106455 | A1 * | 4/2010 | Kiyota | G01B 5/20 702/167 |
| 2012/0062749 | A1 * | 3/2012 | Kawahata | G06K 9/00201 348/152 |
| 2012/0127312 | A1 * | 5/2012 | Nagamine | B60R 1/00 348/148 |
| 2012/0155719 | A1 * | 6/2012 | Yun | G06K 9/00362 382/118 |
| 2013/0034296 | A1 * | 2/2013 | Hattori | G06K 9/00805 382/154 |
| 2013/0222573 | A1 * | 8/2013 | Onuma | E02F 9/24 348/82 |
| 2013/0259391 | A1 | 10/2013 | Kawaguchi et al. | |
| 2014/0003725 | A1 * | 1/2014 | Kawano | G06K 9/3241 382/203 |
| 2014/0063197 | A1 * | 3/2014 | Yamamoto | G08G 1/166 348/46 |
| 2014/0072170 | A1 | 3/2014 | Zhang et al. | |
| 2014/0161305 | A1 * | 6/2014 | Lee | G06K 9/00362 382/103 |
| 2014/0169664 | A1 * | 6/2014 | Han | G06K 9/00362 382/159 |
| 2014/0362220 | A1 * | 12/2014 | Izumikawa | G01S 17/89 348/148 |
| 2015/0035962 | A1 * | 2/2015 | Nagaoka | G08G 1/166 348/77 |
| 2015/0161447 | A1 * | 6/2015 | Fu | G06K 9/46 382/103 |
| 2015/0175071 | A1 | 6/2015 | Ishimoto et al. | |
| 2015/0178557 | A1 * | 6/2015 | Tsai | G06K 9/00362 382/203 |
| 2015/0343948 | A1 * | 12/2015 | Miyagawa | H04N 7/18 348/148 |
| 2016/0005286 | A1 * | 1/2016 | Kiyota | G08B 13/196 340/435 |
| 2016/0028951 | A1 * | 1/2016 | Mayuzumi | G06K 9/00335 348/36 |
| 2016/0086033 | A1 * | 3/2016 | Molin | G06K 9/00671 345/419 |
| 2016/0162747 | A1 * | 6/2016 | Singh | G06K 9/3241 348/148 |
| 2016/0328829 | A1 * | 11/2016 | Kiyota | E02F 9/261 |
| 2017/0024874 | A1 * | 1/2017 | Pang | G06K 9/00771 |
| 2017/0053409 | A1 * | 2/2017 | Yamamoto | G06K 9/00362 |
| 2017/0083760 | A1 * | 3/2017 | Kiyota | G06T 7/00 |
| 2017/0109572 | A1 * | 4/2017 | Tojo | G06K 9/00362 |
| 2017/0327112 | A1 * | 11/2017 | Yokoyama | B60W 30/095 |

FOREIGN PATENT DOCUMENTS

| | | | | |
|---|---|---|---|---|
| JP | 2006-059015 | | 3/2006 | |
| JP | 2008-181423 | | 8/2008 | |
| JP | 2008181423 | A * | 8/2008 | |
| JP | 2010-198207 | | 9/2010 | |
| JP | 2011-065338 | | 3/2011 | |
| JP | 2012-212969 | | 11/2012 | |
| JP | 2012-221437 | | 11/2012 | |
| JP | 2013-037406 | | 2/2013 | |
| JP | 2014-025272 | | 2/2014 | |
| JP | WO2014073571 A1 * | | 9/2016 | ............... E02F 9/24 |
| WO | 2014/073571 | | 5/2014 | |
| WO | WO 2014073571 A1 * | | 5/2014 | ............... E02F 9/24 |
| WO | WO 2014096240 A1 * | | 6/2014 | ......... G06K 9/00369 |

OTHER PUBLICATIONS

Kirt Lillywhite et al "Real-time human detection using histograms of oriented gradients on a GPU", Applications of Computer Vision (WACV), 2009 Workshop on, IEEE, Piscataway, NJ, USA, Dec. 7, 2009, pp. 1-6, XP031622320.
International Search Report dated Sep. 1, 2015.

* cited by examiner

FIG.6C
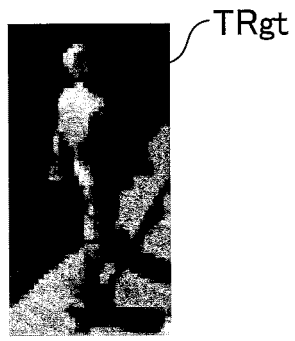
FIG.7A1

FIG.7A2
TRgt3
FIG.7B1
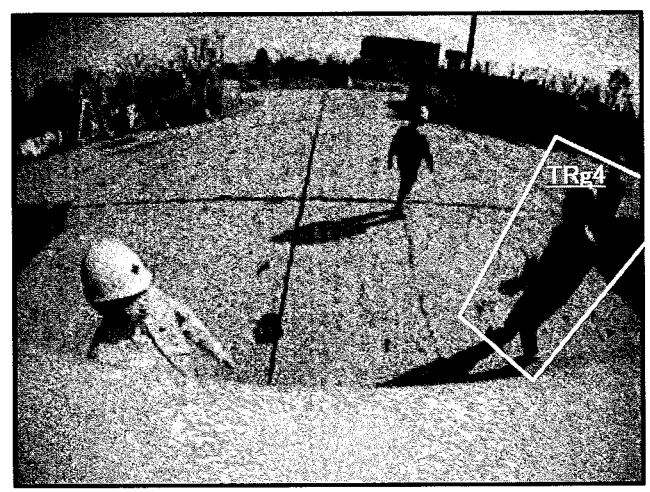

FIG.7B2
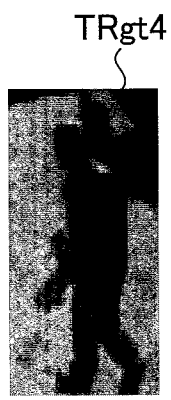
TRgt4
FIG.7C1

FIG.7C2
FIG.8A
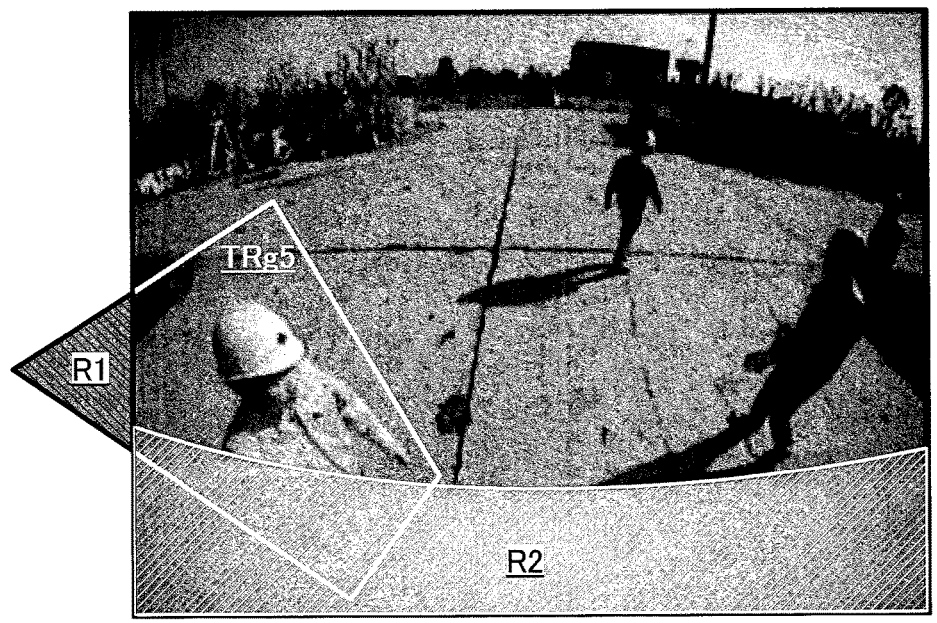

HUMAN DETECTION SYSTEM FOR CONSTRUCTION MACHINE

RELATED APPLICATION

This application is a continuation application of International Application No. PCT/JP2015/065094 filed on May 26, 2015 and designated the U.S., which is based upon and claims the benefit of priority of Japanese Patent Application No. 2014-115227 filed on Jun. 3, 2014, the entire contents of which are incorporated herein by reference.

BACKGROUND

Technical Field

The present invention relates to a human detection system for a construction machine that detects the presence of a human in the vicinity of the construction machine.

Description of Related Art

A human detection device that has an image sensor and a thermopile array is known. Its imaging range and its heat detection range overlap. The device decreases an amount of an unnecessary calculation during an image identification process by confining a face extraction range to a range believed to be a human body indicated by an output of the thermopile array.

However, the above device needs to jointly install the image sensor and the thermopile array and to precisely overlap the imaging range and the heat detection range. Thus, system configuration might become complex.

SUMMARY

According to an embodiment of the present invention, there is provided a human detection system for a construction machine that is configured to detect the presence of a human around the construction machine by using an image captured by an imaging device attached to the construction machine, the system including: an extracting part configured to extract a part of the captured image as an identification process target image; and an identifying part configured to identify whether an image included in the identification process target image extracted by the extraction part is an image of a human in an image identification process; wherein a region of the identification process target image in the captured image is preliminarily associated with one of a predetermined image positions in the captured image, and wherein the extracting part finds out a feature image representing a characteristic portion of a human in the captured image, and extracts the identification process target image by associating a position of the feature image with one of the predetermined image positions.

BRIEF DESCRIPTION OF THE DRAWINGS

FIG. 6C is an example of a normalized image obtained by normalizing an identification process target image having an identification process target image region;

FIG. 7A1 is a view showing an identification process target image in a captured image;

FIG. 7A2 is a view showing a normalized image of an identification process target image having an identification process target image region;

FIG. 7B1 is a view showing an identification process target image in a captured image;

FIG. 7B2 is a view showing a normalized image of an identification process target image having an identification process target image region;

FIG. 7C1 is a view showing an identification process target image in a captured image;

FIG. 7C2 is a view showing a normalized image of an identification process target image having an identification process target image region;

FIG. 8A is a view showing a relationship between an identification process target image region and an identification process inadequate region for an identification process;

DETAILED DESCRIPTION

In view of the related art described above, it is desirable to provide a human detection system for a construction machine that can narrow down an image portion to be targeted for the image identification process in a simpler system configuration.

Figure 1:
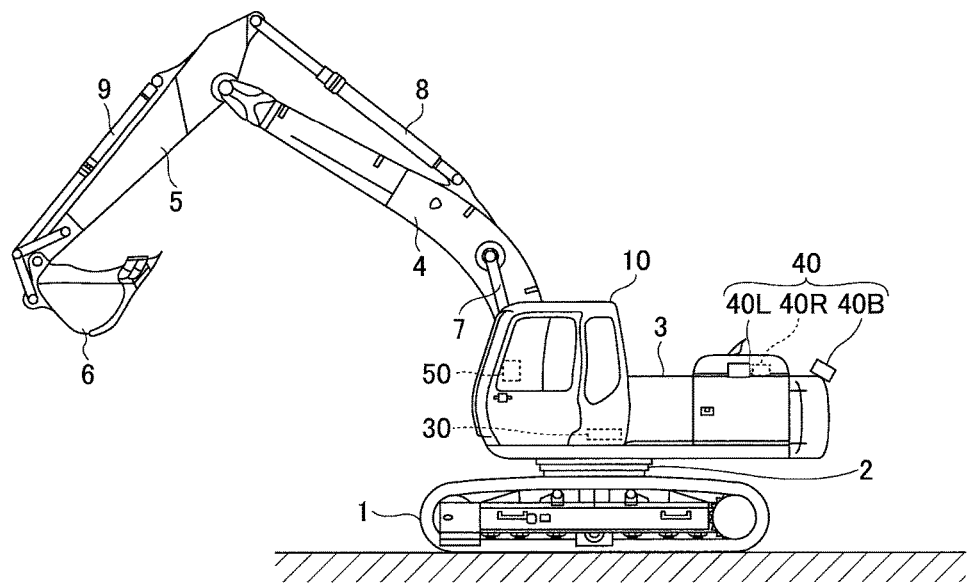
FIG. 1 is a side view of a shovel to which a human detection system according to an embodiment of the present invention is mounted.

FIG. 1 is a side view of a shovel to which a human detection system 100 according to an embodiment of the present invention is mounted to. An upper swing body 3 is mounted on a lower running body 1 via a swing mechanism 2. A boom 4 is attached to the upper swing body 3. An arm 5 is attached to an end of the boom 4, and a bucket 6 is attached to an end of the arm 5. The boom 4, arm 5 and bucket 6 constitutes an excavation attachment, and are hydraulically actuated by a boom cylinder 7, an arm cylinder 8 and a bucket cylinder 9, respectively. Also, a cabin 10 is provided on the upper swing body 3, and a power source such as an engine or the like is mounted on the upper swing body 3. Also, an imaging device 40 is attached to an upper part of the upper swing body 3. Specifically, a rear camera 40B is attached to an upper part of a rear end of upper swing body 3, a left camera 40L is attached to an upper part of a left end of upper swing body 3, and a right camera 40R is attached to an upper part of a right end of the upper swing body 3. Also, a controller 30 and an output device 50 are installed in the cabin 10.

Figure 2:
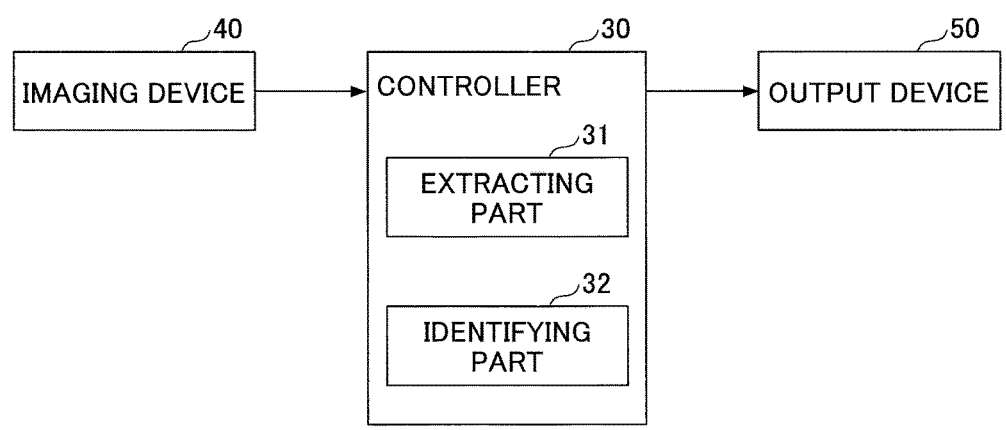
FIG. 2 is a functional block diagram illustrating a configuration example of a human detection system.

FIG. 2 is a functional block diagram illustrating a configuration example of the human detection system 100. The human detection system 100 mainly includes the controller 30, the imaging device 40, and the output device 50.

The controller 30 is a control device that executes a drive control of the shovel. In the present embodiment, the controller 30 is comprised of an arithmetic processing unit including a CPU and an internal memory, and achieves various functions by causing the CPU to execute a program for the drive control stored in the internal memory.

Also, the controller 30 determines whether a human is present around the shovel based on outputs of various devices, and controls various devices in response to the determination result. Specifically, the controller 30 receives an output of the imaging device 40, and executes software programs corresponding to each of an extracting part 31 and an identifying part 32. Then, it performs a drive control of the shovel in response to the execution result, or causes the output device 50 to output various information. The controller 30 may be a control device designed for image processing.

The imaging device 40 is a device that captures an image that represents scenery surrounding the shovel. It outputs the captured image to the controller 30. In the present embodiment, the imaging device 40 is a wide angle camera employing an imaging element such as CCD, and attached to the upper part of the upper swing body 3 so that its optical axis may be directed downward.

The output device 50 is a device that outputs various information. For example, it includes an on-vehicle display that displays various image information, an on-vehicle speaker that outputs various voice information, and the like. In the present embodiment, the output device 50 outputs various information in response to a control command from the controller 30.

The extracting part 31 is a functional element that extracts an identification process target image for an identification process from an image captured by the imaging device 40. Specifically, the extracting part 31 extracts the identification process target image via a relatively low complexity image processing (hereinafter referred to as "pre-stage image recognition process"). The pre-stage image recognition process includes an image processing that extracts a simple feature based on a local luminance gradient or an edge, a geometric feature by a Hough transformation or the like, a feature relating to an area or an aspect ratio of regions divided based on a luminance. The identification process target image for the identification process is an image portion (a part of a captured image) targeted for a subsequent image processing. It includes a candidate human image. The candidate human image is an image portion (a part of a captured image) that is considered to have a high likelihood of being a human image.

The identifying part 32 is a functional element that identifies whether a candidate human image included in the identification process target image extracted by the extracting part 31 is a human image. Specifically, the identifying part 32 identifies whether a candidate human image is a human image via a relatively high complexity image processing (hereinafter referred to as "post-stage image recognition process"). The post-stage image recognition process includes an image recognition process utilizing an image feature quantity description as typified by a Histograms of Oriented Gradients (HOG) feature quantity and a classifier generated by a machine learning, or the like image recognition process. The higher an extraction accuracy of an identification process target image by the extracting part 31 is, the higher a probability for the identifying part 32 to identify a candidate human image as a human image becomes. In a case such as where a desired quality captured image cannot be obtained in an environment unfit for image capturing such as during night-time, during bad weather, or the like, the identifying part 32 may identify all candidate human images as a human image. That is, it may identify all candidate human images in the identification process target images extracted by the extracting part 31 as a human image. This is to prevent it from overlooking a human.

Figure 3A:
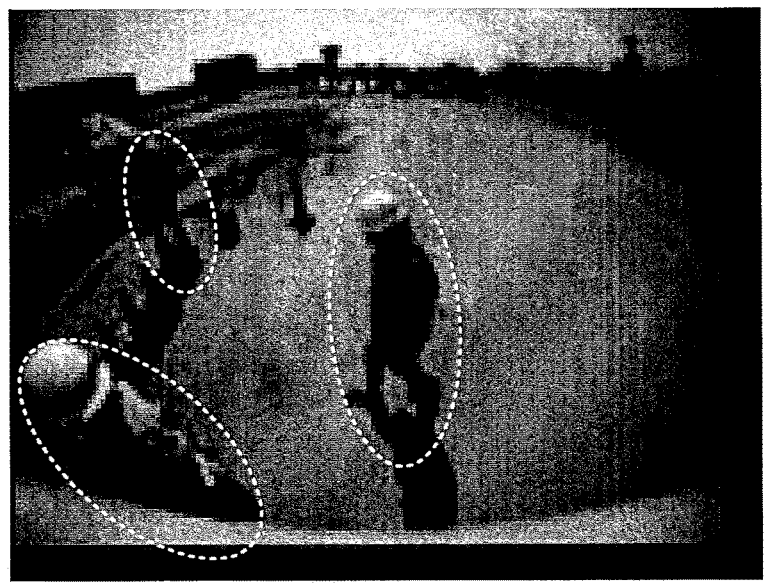
FIG. 3A is an example of an image captured by a rear camera.
Figure 3B:
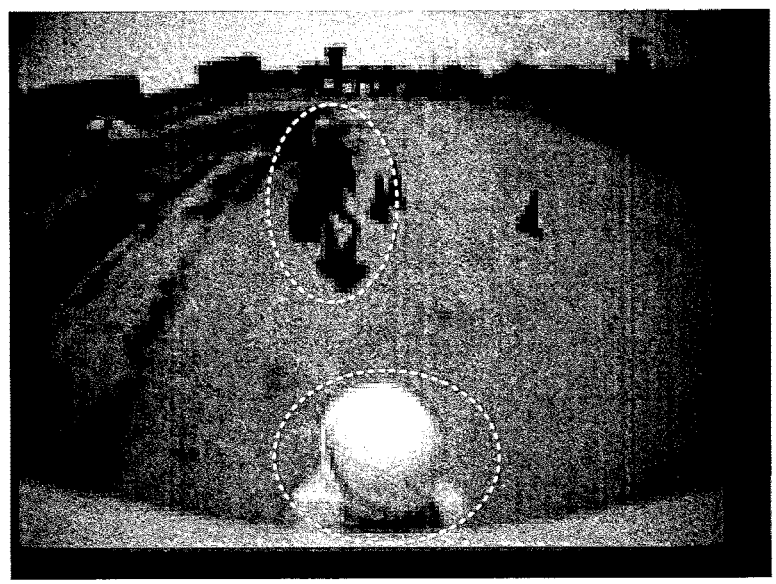
FIG. 3B is an example of an image captured by a rear camera.

Next, referring to FIGS. 3A and 3B, visibilities of human images in a captured image representing a scenery behind the shovel captured by the rear camera 40B will be explained. These two captured images in FIGS. 3A and 3B are examples of captured images by the rear camera 40B. Dotted circles in FIGS. 3A and 3B represent a presence of a human image, and are not displayed in an actual captured image.

The rear camera 40B is a wide angle camera and is attached at the level for looking down a human from diagonally above. Thus, visibilities of human images in a captured image differ depending on which direction, viewed from the rear camera 40B, a human is present. For example, the closer to right and left ends of a captured image a human image in the captured image is, the steeper the human image is displayed to incline. This is attributed to an image inclination due to a wide angle lens of a wide angle camera. Also, the closer to the rear camera 40B a human is, the larger its head portion is displayed. Also, its leg portion gets into a blind side of the machine body of the shovel and goes out of sight. These are attributed to an installation position of the rear camera 40B. Thus, it is difficult to identify a human image included in a captured image by image processing without any treatment of the captured image.

Hence, the human detection system 100 according to an embodiment of the present invention facilitates an identification of a human image included in an identification process target image by normalizing the identification process target image. The "normalization" means that an identification process target image is transformed into an image having a predetermined size and a predetermined shape. In the present embodiment, an identification process target image that may take various shapes in a captured image is transformed into a rectangular image having a predetermined size by projection transform. For example, a projection transform matrix of eight variables is employed as the projection transform.

Figure 4:
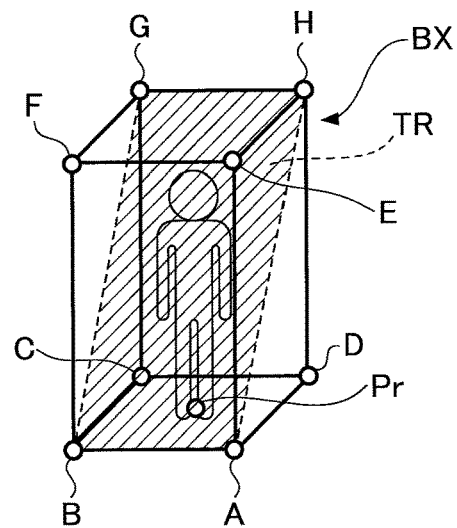
FIG. 4 is schematic view illustrating an example of geometric relationship used when clipping an identification process target image from a captured image.

Here, referring to FIGS. 4 to 6C, an example of a process that the human detection system 100 normalizes an identification process target image (hereinafter referred to as "normalization process") will be explained. FIG. 4 is a schematic view illustrating an example of a geometric relationship used when the extracting part 31 clips an identification process target image from a captured image.

A box BX in FIG. 4 is a virtual three-dimensional object in a real space. In the present embodiment, it is a virtual cuboid defined by eight apexes A-H. Also, a point Pr is a predetermined reference point for referring an identification process target image. In the present embodiment, the reference point Pr is a point preliminarily configured as an assumed standing position of a human. It is located at the center of a quadrangle ABCD defined by four apexes A-D. Also, the size of the box BX is set based on an orientation, a stride length, a stature, or the like of a human. In the present embodiment, the quadrangle ABCD and a quadrangle EFGH are squares, and its side length is 800 mm, for example. Also, a height of the cuboid is 1800 mm, for example. That is, the box BX is a cuboid having a width of 800 mm, a depth of 800 mm, and a height of 1800 mm.

The quadrangle ABGH defined by four apexes A, B, G, and H form a virtual plane region TR corresponding to a region of an identification process target image in a captured image. Also, the quadrangle ABGH as the virtual plane region TR is inclined with respect to a virtual land surface as a horizontal surface.

In the present embodiment, the box BX as the virtual cuboid is employed in order to define a relationship of the reference point Pr and the virtual plane region TR. However, it is not limited to the virtual cuboid if the virtual plane region TR, which faces toward the imaging device 40 and is inclined with respect to the virtual land surface, can be defined in connection with an arbitrary reference point Pr. For example, other geometric relationships, such as a relationship utilizing other virtual three-dimensional objects, may be employed, or other mathematical relationship, such as a function, a conversion table, or the like, may be employed.

Figure 5:
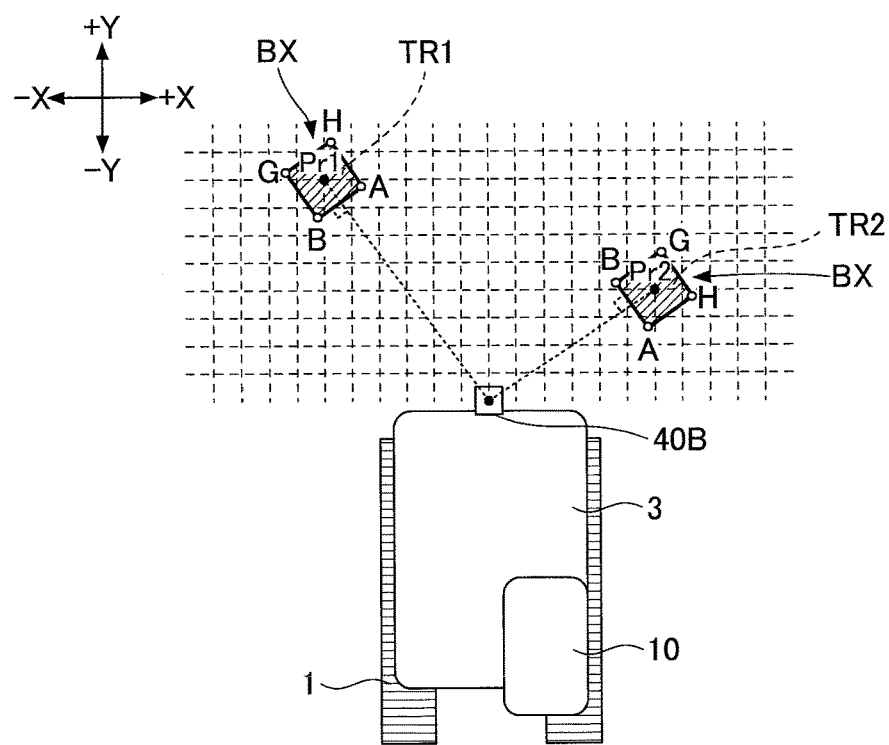
FIG. 5 is a top view of a real space behind a shovel.

FIG. 5 is a top view of a real space behind the shovel. It illustrates a positional relationship of the rear camera 40B and virtual plane regions TR1, TR2 in a case where the virtual plane regions TR1, TR2 have been referred by using reference points Pr1, Pr2. In the present embodiment, the reference point Pr can be placed at each of grid points of a virtual grid on the virtual land surface. However, the reference point Pr may be placed randomly on the virtual land surface, or may be placed at regular intervals on line segments extending radially from a projected point of the rear camera 40B on the virtual land surface. For example, each line segment may extend radially at 1 degree of pitch and the reference point Pr may be placed on each line segment at 100 millimeter intervals.

As shown in FIGS. 4 and 5, a first face of the box BX defined by the quadrangle ABFE (see FIG. 4) is placed to directly confront the rear camera 40B when the virtual plane region TR1 is referred by using the reference point Pr1. That is, a line segment joining the rear camera 40B and the reference point Pr1 bisects the first face of the box BX placed in connection with the reference point Pr1 when viewed from above. Similarly, the first face of the box BX is placed to directly confront the rear camera 40B also when the virtual plane region TR2 is referred by using the reference point Pr2. That is, a line segment joining the rear camera 40B and the reference point Pr2 bisects the first face of the box BX placed in connection with the reference point Pr2 when viewed from above. This relationship is true whichever grid point the reference point Pr is placed on. That is, the box BX is placed so that its first face may always directly confront the rear camera 40B.

Figure 6A:
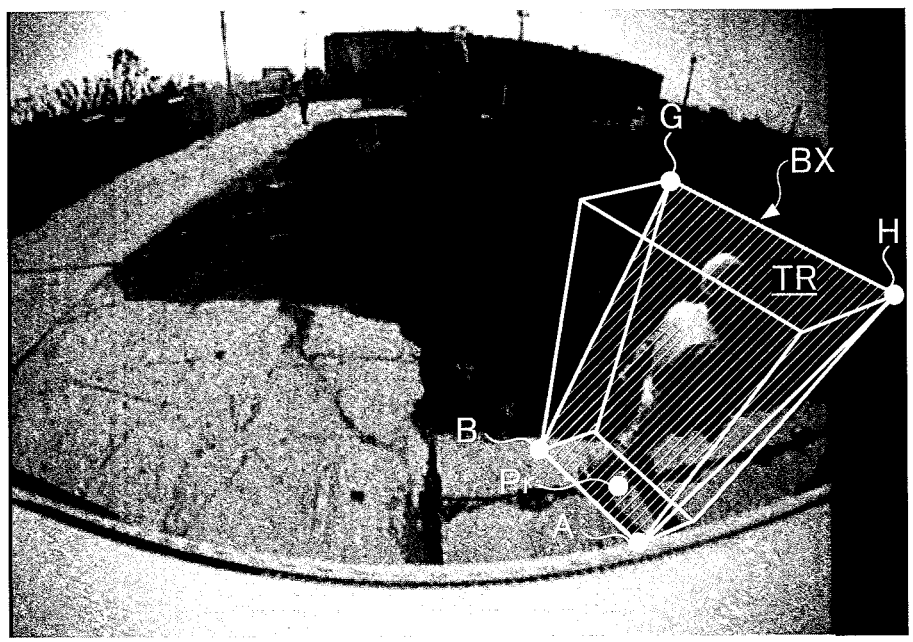
FIG. 6A is an example of an image captured by a rear camera.
Figure 6B:
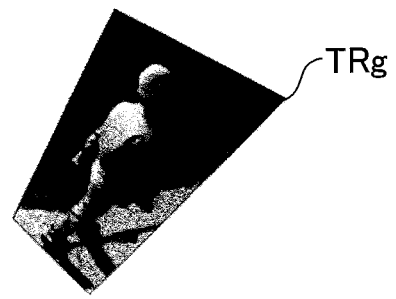
FIG. 6B shows an identification process target image region in a captured image in a clipped state.

FIGS. 6A-6C are views representing a flow of a process for generating a normalized image from a captured image. Specifically, FIG. 6A is an example of a captured image by the rear camera 40B. It illustrates the box BX placed in connection with the reference point Pr in the real space. Also, FIG. 6B is a clipped view of a region TRg of an identification process target image (hereinafter referred to as "an identification process target image region TRg") in the captured image. It corresponds to the virtual plane region TR represented on the captured image of FIG. 6A. Also, FIG. 6C represents a normalized image TRgt obtained by normalizing the identification process target image having the identification process target image region TRg.

As shown in FIG. 6A, the box BX placed in connection with the reference point Pr1 in the real space defines a position of the virtual plane region TR in the real space, and then defines the identification process target image region TRg in the captured image corresponding to the virtual plane region TR.

In this way, once the reference point Pr in the real space is determined, a position of the virtual plane region TR in the real space is determined uniquely, and the identification process target image region TRg in the captured image is also determined uniquely. Then, the extracting part 31 can generate the normalized image TRgt having a predetermined size by normalizing the identification process target image having the identification process target image region TRg. In this embodiment, the size of the normalized image TRgt is 64 vertical pixels by 32 horizontal pixels, for example.

FIGS. 7A1-7C2 are views representing a relationship of a captured image, an identification process target image region, and a normalized image. Specifically, FIG. 7A1 represents an identification process target image region TRg3 in the captured image, and FIG. 7A2 represents a normalized image TRgt3 of an identification process target image having the identification process target image region TRg3. Also, FIG. 7B1 represents an identification process target image region TRg4 in the captured image, and FIG. 7B2 represents a normalized image TRgt4 of an identification process target image having the identification process target image region TRg4. Similarly, FIG. 7C1 represents an identification process target image region TRg5 in the captured image, and FIG. 7C2 represents a normalized image TRgt5 of an identification process target image having the identification process target image region TRg5.

As shown in FIGS. 7A1-7C2, the identification process target image region TRg5 in the captured image is larger than the identification process target image region TRg4 in the captured image. This is because a distance between a virtual plane region corresponding to the identification process target image region TRg5 and the rear camera 40B is less than a distance between a virtual plane region corresponding to the identification process target image region TRg4 and the rear camera 40B. Similarly, the identification process target image region TRg4 in the captured image is larger than the identification process target image region TRg3 in the captured image. This is because a distance between a virtual plane region corresponding to the identification process target image region TRg4 and the rear camera 40B is less than a distance between a virtual plane region corresponding to the identification process target image region TRg3 and the rear camera 40B. That is, the greater the distance between the corresponding virtual plane region and the rear camera 40B, the smaller the identification process target image region in the captured image is. At the same time, the normalized images TRgt3, TRgt4, and TRgt5 are rectangular images having an identical size.

In this way, the extracting part 31 can normalize target images taking various shapes and various sizes in a captured image to rectangular images having a predetermined size, and can normalize a candidate human image including a human image. Specifically, the extracting part 31 locates an image portion assumed to be a head portion of a candidate human image (hereinafter referred to as "a head image portion") in a predetermined region of a normalized image. Also, it locates an image portion assumed to be a trunk portion of the candidate human image (hereinafter referred to as "a trunk image portion") in another predetermined region of the normalized image, and locates an image portion assumed to be a leg portion of the candidate human image (hereinafter referred to as "a leg image portion") in yet another predetermined region of the normalized image. Also, the extracting part 31 can obtain a normalized image in a state where an inclination (an image inclination) of the candidate human image with respect to a shape of the normalized image is alleviated.

Figure 8B:
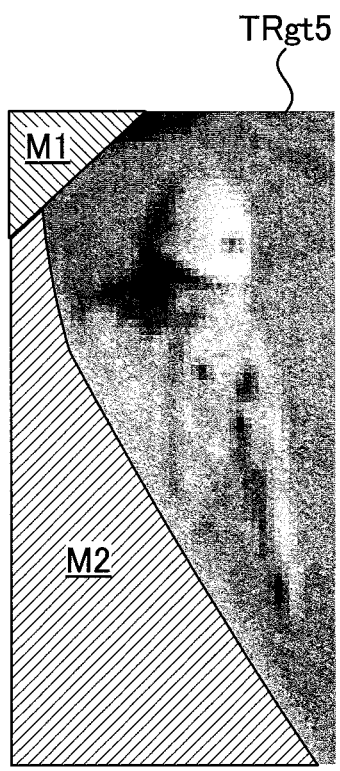
FIG. 8B is a view showing a normalized image including a mask region corresponding to a misfit region and a mask region corresponding to a part of a region where a machine body has been captured.

Next, referring to FIGS. 8A and 8B, a normalization process will be explained in a case where an identification process target image region includes an image region inadequate for an identification (hereinafter referred to as "an identification process inadequate region") that negatively affects an identification of a human image. The identification process inadequate region is a known region where a human image cannot be present. For example, it includes a region where a machine body of the shovel has been captured (hereinafter referred to as "a machine body captured region"), a region that protrudes outside the captured image (hereinafter referred to as "a misfit region"), and the like. FIGS. 8A and 8B are views representing a relationship of an identification process target image region and an identification process inadequate region, and correspond to FIGS. 7C1 and 7C2. Also, a diagonally right down hatched region in FIG. 8A corresponds to a misfit region R1, a diagonally left down hatched region corresponds to a machine body captured region R2.

In this embodiment, in a case where the identification process target image region TRg5 includes the misfit region R1 and a part of the machine body captured region R2, the extracting part 31 applies a mask process to these identification process inadequate regions. Then, after the mask process, it generates the normalized image TRgt5 of the identification process target image having the identification process target image region TRg5. The extracting part 31 may apply the mask process to portions corresponding to the identification process inadequate regions in the normalized image TRgt5 after generating the normalized image TRgt5.

FIG. 8B represents the normalized image TRgt5. Also, in FIG. 8B, the diagonally right down hatched region represents a mask region M1 corresponding to the misfit region R1, the diagonally left down hatched region represents a mask region M2 corresponding to the machine body captured region R2.

In this way, the extracting part 31 prevents an image in the identification process inadequate region from affecting an identification process by the extracting part 32 by applying a mask process to the image in the identification process inadequate region. Due to this mask process, the identifying part 32 can identify whether it is a human image by using image portions in regions other than the mask regions in the normalized image without suffering any influence from image portions in the identification process inadequate regions. The extracting part 31 may prevent image portions in the identification process inadequate regions from affecting an identification process by the identifying part 32 with any known method other than the mask process.

Figure 9:
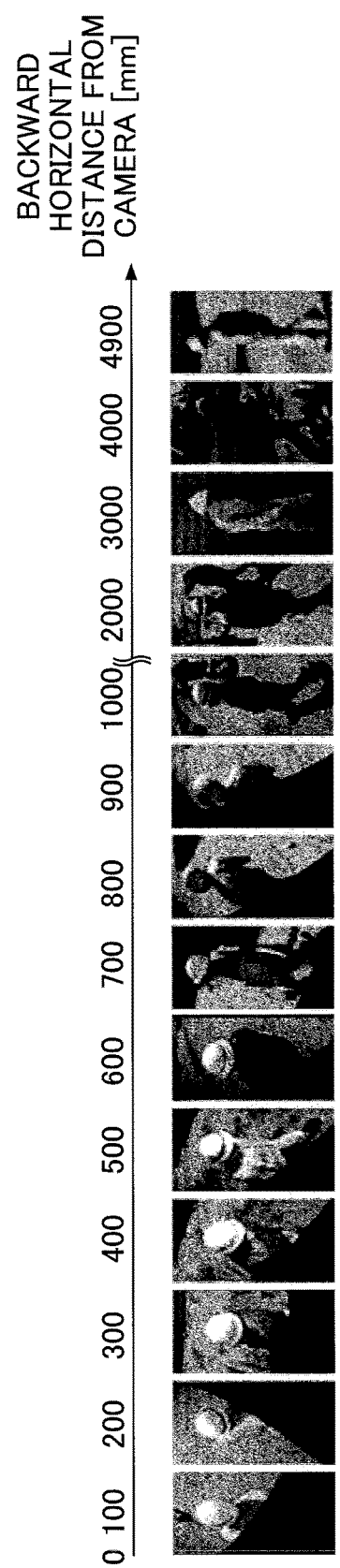
FIG. 9 is a view showing normalized images.

Next, referring to FIG. 9, features of a normalized image generated by the extracting part 31 will be explained. FIG. 9 is a view representing examples of normalized images. Also, as to 14 normalized images in FIG. 9, the closer to the left end of the figure a normalized image is, the closer to the rear camera 40B a human captured in a normalized image is. The closer to the right end of the figure a normalized image is, the farther from the rear camera 40B a human captured in a normalized image is.

As shown in FIG. 9, the extracting part 31 can allocate a head image portion, a trunk image portion, a leg image portion, and the like at almost identical rate in either normalized image, independently of a backward horizontal distance (a horizontal distance in a Y axis direction in FIG. 5) between the virtual plane region TR and the rear camera 40B in the real space. Thus, the extracting part 31 can decrease a computation load when the identifying part 32 executes an identification process, and can enhance a reliability of the identification result. The above backward horizontal distance is an example of a piece of information relating to a positional relationship between the virtual plane region TR and the rear camera 40B in the real space. The extracting part 31 adds the information to the extracted identification process target image. Also, the information relating to the above positional relationship includes an angle of a line segment with respect to an optical axis of the rear camera 40B when viewed from above, or the like. The line segment connects the rear camera 40B and the reference point Pr corresponding to the virtual plane region TR.

Figure 10:
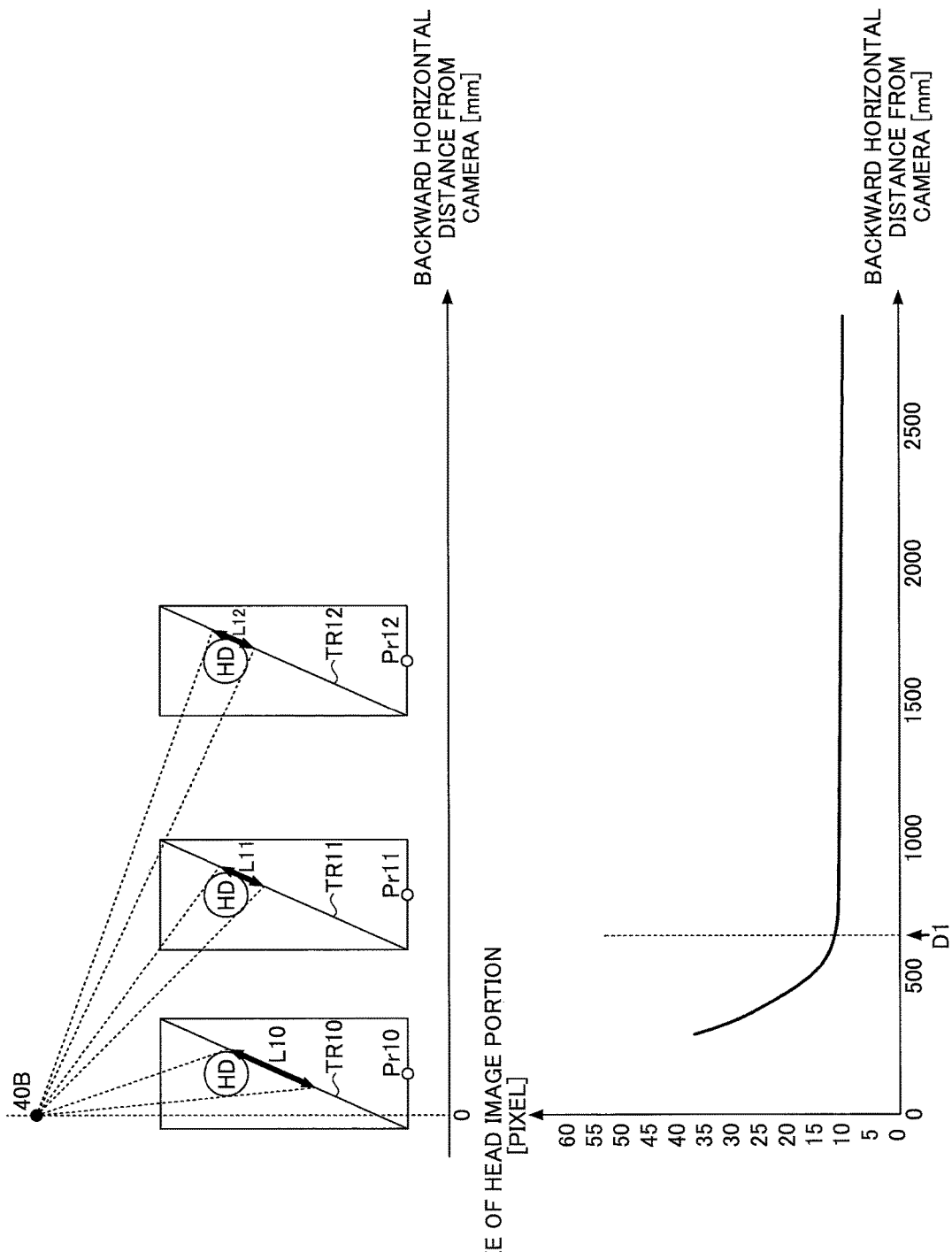
FIG. 10 is a diagram explaining a relationship of a size of head image portion in a normalized image and a backward horizontal distance between a virtual plane region in a real space and a rear camera.

Next, referring to FIG. 10, a relationship of a backward horizontal distance and a size of a head image portion in a normalized image will be explained. The upper diagram in FIG. 10 illustrates sizes L10, L11, L12 of head image portions when humans is present at three reference points Pr10, Pr11, Pr12 having different backward horizontal distances from the rear camera 40B. The horizontal axis corresponds to a backward horizontal distance. Also, the lower diagram in FIG. 10 illustrates a relationship of a backward horizontal distance and a size of a head image portion. The vertical axis corresponds to a size of a head image portion, and the horizontal axis corresponds to a backward horizontal distance. The horizontal axes are common to the upper and lower diagrams in FIG. 10. Also, in the present embodiment, a camera height is 2100 mm, a height of the center of the head portion HD from a land surface is 1600 mm, and a diameter of the head portion is 250 mm.

As shown in the upper diagram in FIG. 10, when a human is present at a position indicated by the reference point Pr10, the size L10 of the head image portion corresponds to a size of a projection image of the head portion HD onto the virtual plane region TR10 when viewed from the rear camera 40B. Similarly, when humans are present at positions indicated by the reference points Pr11, Pr12, the sizes L11, L12 of the head image portions correspond to sizes of projection images of the head portions HD onto the virtual plane regions TR11, TR12 when viewed from the rear camera 40B. A size of a head image portion in a normalized image varies depending on a size of a projection image.

Then, as shown in the lower diagram in FIG. 10, a size of a head image portion in a normalized image is maintained at almost identical size when a backward horizontal distance is equal to or greater than D1 (for example, 700 mm), while it sharply increases when a backward horizontal distance becomes less than D1.

To that end, the identifying part 32 changes details of an identification process depending on a backward horizontal distance. For example, when the identifying part 32 uses a supervised learning (a machine learning) technique, the identifying part 32 divides learning samples used for the identification process into groups by a predetermined backward horizontal distance (for example, 650 mm) as a border. Specifically, it divides the learning samples into a short distance group and a long distance group. Due to this configuration, the identifying part 32 can identify a human image with a higher degree of accuracy.

Due to the above configuration, the human detection system 100 generates the normalized image TRgt from the identification process target image region TRg corresponding to the virtual plane region TR that faces towards the imaging device 40 and is inclined with respect to a virtual land surface as a horizontal surface. Thus, it can realize normalization in consideration of visibilities in a height direction and in a depth direction of a human. As a result, it can more reliably detect the presence of a human around a construction machine even in the case of using a captured image by the imaging device 40 attached to the construction machine to capture a human from diagonally above. Particularly, even if a human approaches the imaging device 40, it can reliably detect the human since it can generate a normalized image from an identification process target image that occupies a sufficiently large region in a captured image.

Also, the human detection system 100 defines the virtual plane region TR as a rectangular region formed by four apexes A, B, G, and H of the box BX that is a virtual cuboid in the real space. Thus, it can geometrically associate the reference point Pr with the virtual plane region TR in the real space. Moreover, it can geometrically associate the virtual plane region TR in the real space with the identification process target image region TRg in the captured image.

Also, the extracting part 31 applies a mask process to an image portion in an identification process inadequate region included in the identification process target image region TRg. Thus, the identifying part 32 can identify whether it is a human image by using an image portion in a region other than a mask region in a normalized image without suffering any influence from image portions in the identification process inadequate regions including the machine body captured region R2.

Also, when the extracting part 31 has extracted an identification process target image, the extracting part 31 adds a backward horizontal distance between the virtual plane region TR and the imaging device 40 as a piece of information relating to a positional relationship thereof to the identification process target image. Then, the identifying part 32 changes details of an identification process depending on the backward horizontal distance. Specifically, the identifying part 32 divides learning samples used for the identification process into groups by a predetermined backward horizontal distance (for example, 650 mm) as a border. Due to this configuration, the identifying part 32 can identify a human image with a higher degree of accuracy.

Also, the extracting part 31 can extract an identification process target image for each reference point Pr. Also, each of the identification process target image regions TRg is associated with one of the reference points Pr preliminarily configured as assumed standing positions of a human via a corresponding virtual plane region TR. Thus, the human detection system 100 can extract an identification process target image that is likely to include a candidate human image by extracting in an arbitrary manner a reference point Pr where a human is likely to be present. In this case, it can prevent an identification process by a relatively high complexity image processing from being applied to an identification process target image that is less likely to include a candidate human image, and can achieve speeding up of a human detection process.

Figure 11:
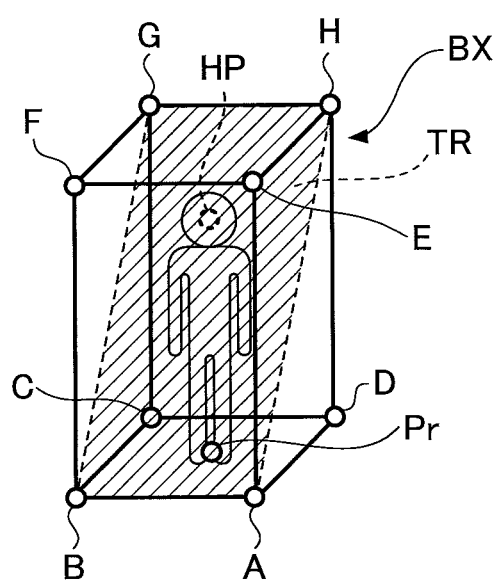
FIG. 11 is a schematic view illustrating another example of geometric relationship used when clipping an identification process target image from a captured image.
Figure 12A:
FIG. 12A is a view showing an example of a feature image in a captured image.
Figure 12B:
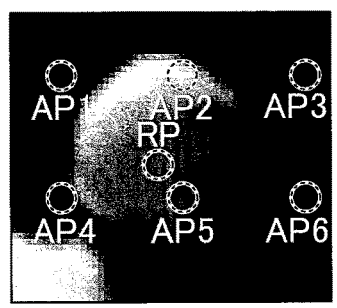
FIG. 12B is an enlarged view of a helmet image as a feature image.

Next, referring to FIGS. 11, 12A, and 12B, an example of a process where the extracting part 31 extracts an identification process target image that is likely to include a candidate human image will be explained. FIG. 11 is a schematic diagram illustrating an example of geometric relationship used when the extracting part 31 clips an identification process target image from a captured image, and corresponds to FIG. 4. FIGS. 12A and 12B represent an example of feature image in the captured image. The feature image is an image representing a characteristic portion of a human, and preferably an image representing a portion, the height of which from the land surface in the real space is nearly unchanged. Thus, the feature image includes, for example, an image of a helmet, an image of a shoulder, an image of a head, an image of a reflector or a marker attached to a human, or the like.

Particularly, a helmet is nearly spherical in shape, and has a feature that its projection image projected onto an captured image is always nearly circular independently of whichever direction it is captured from. Also, a helmet has a hard surface and is lustrous or semi-lustrous, has a feature that its projection image projected onto a captured image tends to generate a local high luminance region and radial luminance gradient centered on the region. Thus, an image of a helmet is particularly suitable for a feature image. The feature that its projection image is nearly circular, the feature that it tends to generate the radial luminance gradient centered on the local high luminance region, or the like may be utilized for an image processing to find out an image of a helmet from a captured image. Also, the image processing to find out an image of a helmet from a captured image includes, for example, the luminance smoothing process, the Gaussian smoothing process, the local maximum luminance point search process, the local minimum luminance point search process, or the like.

Also, a light device may be located near the imaging device 40 in order to stably elicit the feature that it tends to generate a radial gradation (luminance gradient) centered on a local high luminance region in a captured image. In this case, the light device is, for example, mounted on the imaging device 40 so that it may illuminate an imaging range of the imaging device 40.

Figure 13:
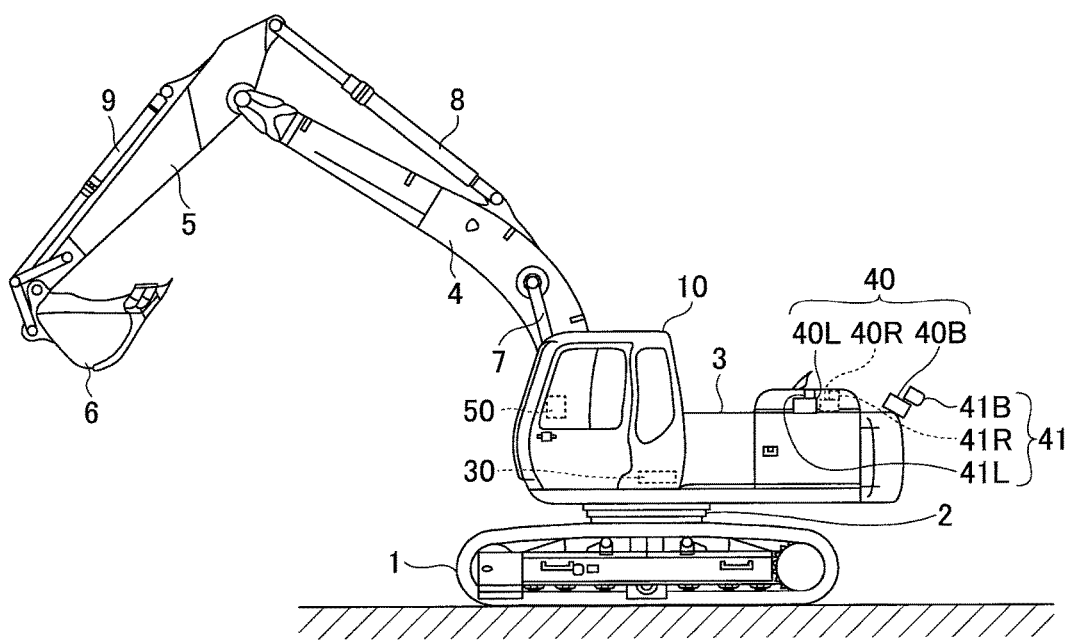
FIG. 13 is a side view of a shovel to which a light device is mounted.

FIG. 13 is a side view of a shovel that the light device 41 is mounted on. Specifically, a rear light device 41B, a left light device 41L, a right light device 41R are mounted on the rear camera 40B, the left camera 40L, the right camera 40R, respectively.

Due to this configuration, the light device can accentuate a radial luminance gradient centered on a local high luminance region in a captured image formed by a light reflected from a helmet. Also, the light device can accentuate a helmet having a color that is less distinguishable from a background color, and can accentuate a helmet even at a situation where an environmental light is poor such as in doors or at night-time.

In the present embodiment, the extracting part 31 finds out a helmet image (in a precise sense, an image supposed to be an image of a helmet) in a captured image via the pre-stage image recognition process. This is because a human working around the shovel is supposed to wear a helmet. Then, the extracting part 31 derives a most highly correlated reference point Pr with a position of the found out helmet image. On that basis, the extracting part 31 extracts an identification process target image corresponding to the reference point Pr.

Specifically, the extracting part 31 derives a most highly correlated reference point Pr with a position of a helmet image in a captured image by using the geometric relationship illustrated in FIG. 11. The geometric relationship in FIG. 11 is different from the geometric relationship in FIG.

4 in that it defines a virtual head position HP in the real space. However, they are common in other points.

A virtual head position HP indicates a head position of a human supposed to be present on a reference point Pr, and located directly above the reference point Pr. In the present embodiment, it is located at a height of 1700 mm above the reference point Pr. Thus, once a virtual head position HP in the real space has been determined, a position of a reference point Pr in the real space is uniquely determined, and therefore a position of an identification process target image region TRg is uniquely determined. Then, the extracting part 31 can generate a normalized image TRgt having a predetermined size by normalizing an identification process target image having the identification process target image region TRg.

Conversely, once a position of a reference point Pr in the real space has been determined, a virtual head position HP in the real space is uniquely determined, and therefore a head image position AP in a captured image corresponding to the virtual head position HP in the real space is uniquely determined. Thus, a head image position AP may be preliminarily configured to be associated with each of predetermined reference points Pr. A head image position AP may be derived from a reference point PR in real time.

To that end, the extracting part 31 searches for a helmet image in an image captured by the rear camera 40B via the pre-stage image recognition process. FIG. 12A represents a state where the extracting part 31 has found out a helmet image HRg. Then, when the extracting part 31 has found out the helmet image HRg, the extracting part 31 determines its representative position RP. A representative position RP is a position derived from a size, a shape, or the like of a helmet image HRg. In the present embodiment, the representative position RP is a position of a central pixel of a helmet image region including the helmet image HRg. FIG. 12B is an enlarged view of the helmet image region as a rectangular image region delimited by a white line in FIG. 12A. It indicates that the position of the central pixel of the helmet image region corresponds to the representative position RP.

Subsequently, the extracting part 31 derives a head image position AP that is the closest to the representative point RP by using the nearest neighbor search algorithm, for example. FIG. 12B shows that six head image positions AP1-AP6 are preliminarily set near the representative position RP, and that the head image position AP5 is the closest head image position AP to the representative position RP.

Then, the extracting part 31 extracts a corresponding identification process target image region TRg by following links from the derived closest head image position AP to a virtual head position HP, a reference point PR, and a virtual plane region TR by using the geometric relationship illustrated in FIG. 11. Subsequently, the extracting part 31 generates a normalized image TRgt by normalizing an identification process target image having the extracted identification process target image region TRg.

In this way, the extracting part 31 extracts an identification process target image by associating the representative position RP of the helmet image HRg as a position of a feature image of a human in the captured image with one of the predetermined head image positions AP (the head image position AP5).

The extracting part 31 may extract an identification process target image corresponding to a head image position AP by using a reference table that directly associates the head image position AP with a reference point Pr, a virtual plane region TR, or an identification process target image region TRg, instead of using the geometric relationship illustrated in FIG. 11.

Also, the extracting part 31 may derive a reference point Pr from a representative position RP by using a known algorithm other than the nearest neighbor search algorithm, such as the hill climbing method, the mean-shift method, or the like. For example, when using the hill climbing method, the extracting part 31 derives head image positions AP near a representative position RP, and connects the representative position RP and each of reference points Pr corresponding to each of the head image positions AP. In this case, the extracting part 31 weights the reference points Pr so that the closer to the representative position RP a head image position AP is, the greater a weighted value becomes. Then, it extracts an identification process target image region TRg corresponding to a reference point PR that has a weighted value closest to the local maximum point of the weight based on a distribution of weighted values of reference points PR.

Figure 14:
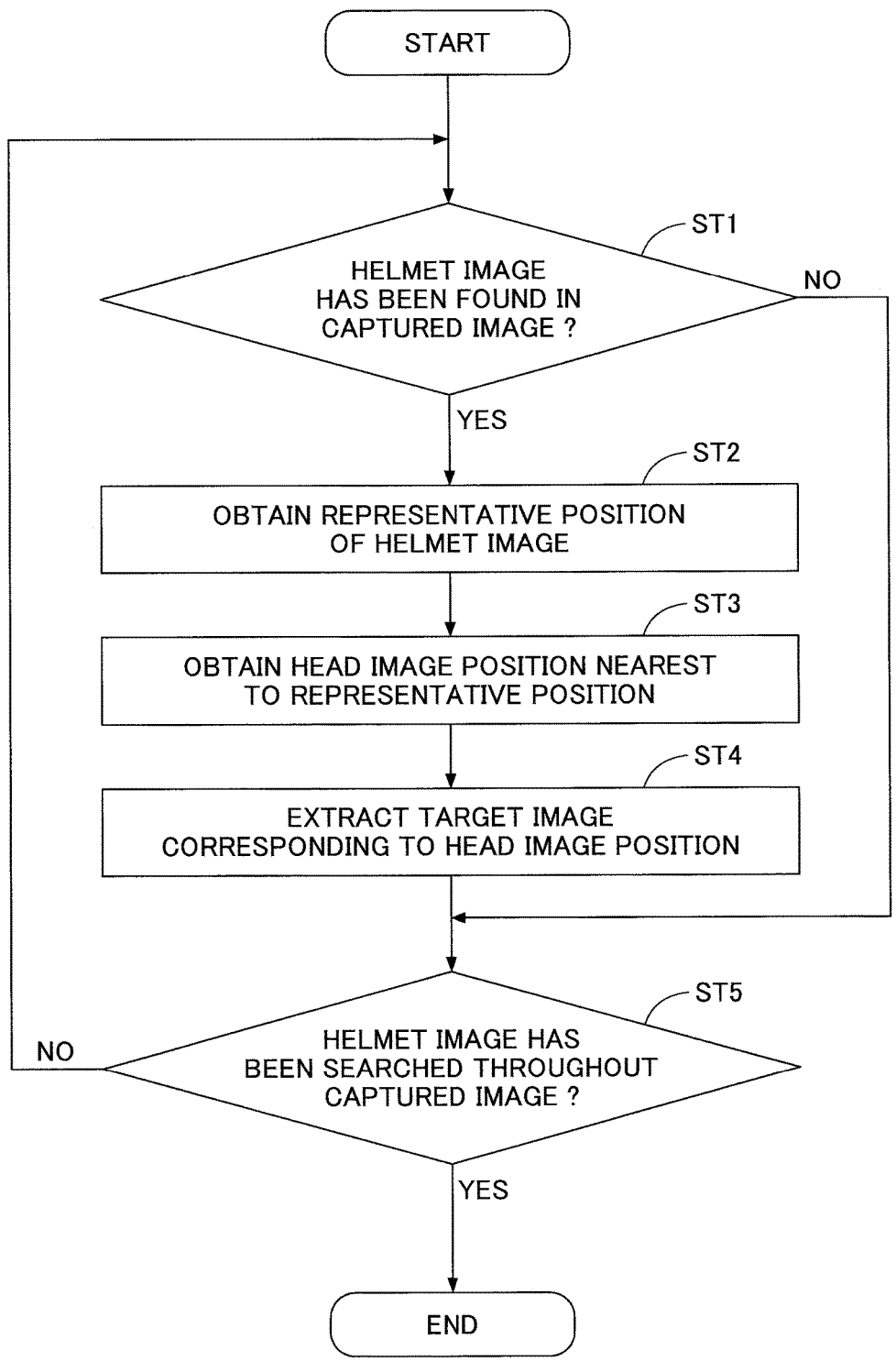
FIG. 14 is a flowchart illustrating an example of an image extraction process.

Next, referring to FIG. 14, an example of a process where the extracting part 31 of the controller 30 extracts an identification process target image (hereinafter referred to as "image extraction process") will be explained. FIG. 14 is a flowchart illustrating a flow of an example of the image extraction process.

First, the extracting part 31 searches a helmet image in a captured image (step ST1). In the present embodiment, the extracting part 31 finds out (i.e., identifies) a helmet image by raster-scanning an image captured by the rear camera 40B in the pre-stage image recognition process.

When the extracting part 31 has found out a helmet image HRg in the captured image (YES in step ST1), the extracting part 31 obtains a representative position RP of the helmet image HRg (step ST2).

Subsequently, the extracting part 31 obtains a head image position AP that is the closest to the obtained representative position RP (step ST3).

Subsequently, the extracting part 31 extracts an identification process target image corresponding to the obtained head image position AP (step ST4). In the present embodiment, the extracting part 31 extracts an identification process target image by following a correspondence relationship of the head image position AP in the captured image, a virtual head position HP in the real space, a reference point Pr as an assumed standing position of a human in the real space, and a virtual plane region TR in the real space, by using the geometric relationship illustrated in FIG. 11.

When the extracting part 31 has not found out a helmet image HRg in the captured image (NO in step ST1), the extracting part 31 advances the process to step ST5 without extracting an identification process target image.

Subsequently, the extracting part 31 determines whether it has searched for a helmet image throughout the captured image (step ST5).

When the extracting part 31 has determined that it has not searched throughout the captured image yet (NO in step ST5), the extracting part 31 applies processes in steps ST1-ST4 to another region in the captured image.

In contrast, when the extracting part 31 has determined that it has completed a search for a helmet image throughout the captured image (YES in step ST5), the extracting part 31 terminates this image extraction process.

In this way, the extracting part 31 finds out a helmet image HRg first, and then determines an identification process target image region TRg from the found out helmet image HRg through a virtual head position HP, a reference point Pr (assumed standing position of a human), and a virtual plane region TR. Then, it can generate a normalized image TRgt having a predetermined size by extracting and normalizing an identification process target image having the determined identification process target image region TRg.

Figure 15:
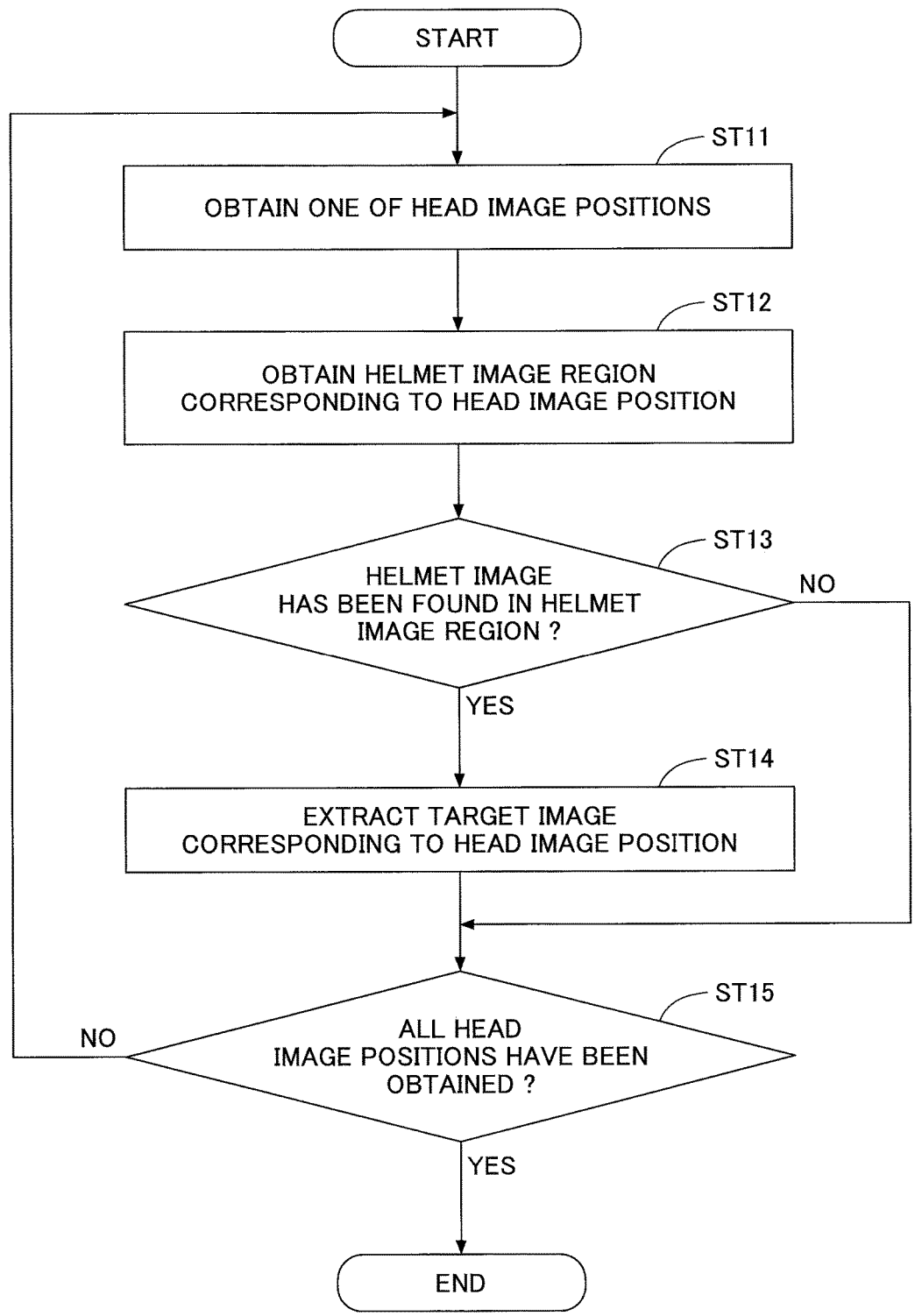
FIG. 15 is a flowchart illustrating another example of an image extraction process.

Next, referring to FIG. 15, another example of the image extraction process will be explained. FIG. 15 is a flowchart illustrating a flow of another example of the image extraction process.

First, the extracting part 31 obtains one of head image positions AP (step ST11). Subsequently, the extracting part 31 obtains a helmet image region corresponding to the head image position AP (step ST12). In the present embodiment, the helmet image region is an image region having a predetermined size preliminarily set for each of the head image positions AP.

Subsequently, the extracting part 31 searches for a helmet image in the helmet image region (step ST 13). In the present embodiment, the extracting part 31 finds out a helmet image by raster-scanning the helmet image region in the pre-stage image recognition process.

When the extracting part 31 has found out a helmet image HRg in the helmet image region (YES in step ST13), the extracting part 31 extracts an identification process target image corresponding to a head image position AP at the time (step ST 14). In the present embodiment, the extracting part 31 extracts an identification process target image by following a correspondence relationship of the head image position AP in the captured image, a virtual head position HP in the real space, a reference point Pr as an assumed standing position of a human in the real space, and a virtual plane region TR in the real space, by using the geometric relationship illustrated in FIG. 11.

When the extracting part 31 has not found out a helmet image HRg in the helmet image region (NO in step ST13), the extracting part 31 advances the process to step ST 15 without extracting an identification process target image.

Subsequently, the extracting part 31 determines whether it has obtained all of the head image positions AP (step ST 15). Then, when the extracting part 31 has determined that it has not obtained all of the head image positions AP yet (NO in step ST 15), the extracting part 31 obtains another not-yet-obtained head image position AP, and executes processes in steps ST11-ST14. In contrast, when the extracting part 31 has determined that it has obtained all of the head image position AP (YES in step ST 15), the extracting part 31 terminates this image extraction process.

In this way, the extracting part 31 obtains one of the head image positions AP first. Then, when the extracting part 31 has found out a helmet image HRg in a helmet image region corresponding to the obtained head image position AP, it determines an identification process target image region TRg from the head image position AP at the time through a virtual head position HP, a reference point Pr (an assumed standing position of a human), a virtual plane region TR. Then, it can generate a normalized image TRgt having a predetermined size by extracting and normalizing an identification process target image having the determined identification process target image region TRg.

Due to the above configuration, the extracting part 31 of the human detection system 100 finds out a helmet image as a feature image in a captured image, and extracts an identification process target image by associating a representative position RP of the helmet image with one of helmet image positions AP as a predetermined image position. Thus, it can narrow down image portions targeted for the post-stage image recognition process in a simple system configuration.

The extracting part 31 may find out a helmet image HRg in a captured image first, derive one of head image positions AP corresponding to a representative position RP of the helmet image HRg, and extract an identification process target image corresponding to the one of the head image positions AP. Alternatively, the extracting part 31 may obtain one of head image positions AP first, and then, when a helmet image is present in a helmet image region that is a predetermined region including a position of a feature image corresponding to the one of the head image positions AP, extract an identification process target image corresponding to the one of the head image positions AP.

Also, the extracting part 31 may extract an identification process target image via a representative position RP of a helmet image in the captured image by using a predetermined geometric relationship as illustrated in FIG. 11. In this case, the predetermined geometric relationship represents a geometric relationship of an identification process target image region TRg in a captured image, a virtual plane region TR in the real space corresponding to the identification process target image region TRg, a reference point Pr (an assumed standing position of a human) in the real space corresponding to the virtual plane region TR, a virtual head position HP corresponding to the reference point Pr (a virtual feature position that is a position in the real space of a characteristic portion of a human corresponding to the assumed standing position of the human), and a head image position AP in the captured image corresponding to the virtual head position HP (a predetermined image position in the captured image corresponding to the virtual feature position).

According to certain embodiments, it is possible to provide a human detection system for a construction machine that can narrow down an image portion to be targeted for the image identification process in a simpler system configuration.

It should be understood that the invention is not limited to the above-described embodiments, but may be modified into various forms on the basis of the spirit of the invention. Additionally, the modifications are included in the scope of the invention.

For example, the above embodiments assume a case a human is detected by using an image captured by the imaging device 40 mounted on the upper swing body 4 of the shovel. However, the present invention shall not be limited to this configuration. For example, it may be applied to a configuration that uses an image captured by an imaging device attached to a main body part of a crane, a lifting magnet machine, or the like.

Also, in the above embodiments, a blind side of the shovel is captured by three cameras. However, the blind side of the shovel may be captured by one, two, or more than three cameras.

What is claimed is:

1. A human detection system for a construction machine that is configured to detect the presence of a human around the construction machine by using an image captured by an imaging device attached to the construction machine, the system comprising:
   a memory; and
   a processor coupled to the memory, and configured to
      search digital data of the captured image for digital data of a feature image representing a human characteristic portion to identify the feature image in the captured image;
      extract a part of the digital data of the captured image as a target image, the target image including an image corresponding in size to a whole human body that includes the identified feature image; and identify whether the image included in the target image is a human image, wherein the target image corresponds to a preset point most correlated with a position of the feature image in the captured image among a plurality of preset points that are assumed standing positions of the human in a real space.

2. The human detection system for the construction machine as claimed in claim 1, wherein the feature image includes an image of a helmet, an image of a shoulder, an image of a head, or an image of a reflector or a marker attached to a human.

3. The human detection system for the construction machine-as claimed in claim 1, wherein the processor is configured to extract the target image including the identified feature image in the captured image by utilizing a predetermined geometric relationship, wherein the predetermined geometric relationship indicates a geometric relationship of a region of the target image in the captured image, a virtual plane region in the real space corresponding to the region of the target image, an assumed standing position of the human in the real space corresponding to the virtual plane region, a virtual feature position as a position of a characteristic portion of the human in the real space corresponding to the assumed standing position, and a predetermined image position in the captured image corresponding to the virtual feature position.

4. The human detection system for the construction machine as claimed in claim 3, wherein the processor is configured to normalize the target image, and wherein a head image portion, a trunk image portion, and a leg image portion are allocated equally in the normalized target image, independently of a distance between the virtual plane region and the imaging device.

5. The human detection system for the construction machine as claimed in claim 4, wherein the normalized target image includes a first normalized target image and a second normalized target image, and wherein a first head image portion in the first normalized target image is the same size as a second head image portion in the second normalized target image when the distance is equal to or greater than a predetermined value.

6. The human detection system for the construction machine as claimed in claim 1, wherein a region of the target image in the captured image is associated with a grid point of a virtual grid placed on a horizontal surface in the real space.

7. The human detection system for the construction machine as claimed in claim 6, wherein the processor is configured to derive the position of the feature image, and wherein the position of the feature image is associated with a grid point of the virtual grid.

8. The human detection system for the construction machine as claimed in claim 1, wherein the processor is configured to search the digital data of the captured image by raster-scanning the captured image to identify the feature image.

9. The human detection system for the construction machine as claimed in claim 1, wherein the processor is configured to search the digital data of the captured image for digital data of an image whose projection image projected onto the captured image is nearly circular to identify the feature image.

10. The human detection system for the construction machine as claimed in claim 1, wherein the processor is configured to search the digital data of a plurality of regions of the captured image region by region for the digital data of the feature image, and a size of each of the plurality of regions and a size of the target image change in accordance with a distance from a position of the imaging device.

11. The human detection system for the construction machine as claimed in claim 1, wherein the target image is more inclined as the target image is more angled relative to the imaging device.

12. The human detection system for the construction machine as claimed in claim 1, wherein the plurality of preset points are placed at corresponding grid points of a virtual grid on a virtual land surface, a plurality of virtual plane regions are correlated with the corresponding preset points on the virtual land surface, and the processor is configured to extract the digital data of the part of the captured image as the target image, the part of the captured image corresponding to one of the plurality of virtual plane regions.

13. The human detection system for the construction machine as claimed in claim 12, wherein the processor is configured to extract the digital data of the part of the captured image as the target image using a reference table or a geometric relationship of the plurality of preset points and the plurality of virtual plane regions based on a position of the identified feature image.

14. The human detection system for the construction machine as claimed in claim 1, wherein the processor is configured to mask a region of a machine body of the construction machine in the target image.

15. A shovel that is configured to detect the presence of a human around the shovel by using an image captured by an imaging device, the shovel comprising:

a memory; and a processor coupled to the memory, and configured to
search digital data of the captured image for digital data of a feature image representing a human characteristic portion to identify the feature image in the captured image;

extract a part of the digital data of the captured image as a target image, the target image including an image corresponding in size to a whole human body that includes the identified feature image; and identify whether the image included in the target image is a human image, wherein the target image corresponds to a preset point most correlated with a position of the feature image in the captured image among a plurality of preset points that are assumed standing positions of the human in a real space.

16. A human detection system that is configured to detect the presence of a human by using an image captured by an imaging device of which an optical axis is directed diagonally downward, the system comprising:

a memory; and a processor coupled to the memory, and configured to
search digital data of the captured image for digital data of a feature image representing a human characteristic portion to identify the feature image in the captured image;

extract a part of the digital data of the captured image as a target image, the target image including an image corresponding in size to a whole human body that includes the identified feature image; and identify whether the image included in the target image is a human image, wherein the target image corresponds to a preset point most correlated with a position of the feature image in the captured image among a plurality of preset points that are assumed standing positions of the human in a real space.

17. The human detection system as claimed in claim 16, wherein the processor is configured to extract the target image including the identified feature image in the captured image by utilizing a predetermined geometric relationship, wherein the predetermined geometric relationship indicates a geometric relationship of a region of the target image in the captured image, a virtual plane region in the real space corresponding to the region of the target image, an assumed standing position of the human in the real space corresponding to the virtual plane region, a virtual feature position as a position of a characteristic portion of the human in the real space corresponding to the assumed standing position, and a predetermined image position in the captured image corresponding to the virtual feature position.

18. The human detection system as claimed in claim 16, wherein a region of the target image in the captured image is associated with a grid point of a virtual grid placed on a horizontal surface in the real space.

* * * * *